(No Model.)
W. A. LOVELIS.
TURNING PLOW.
No. 436,484. Patented Sept. 16, 1890.
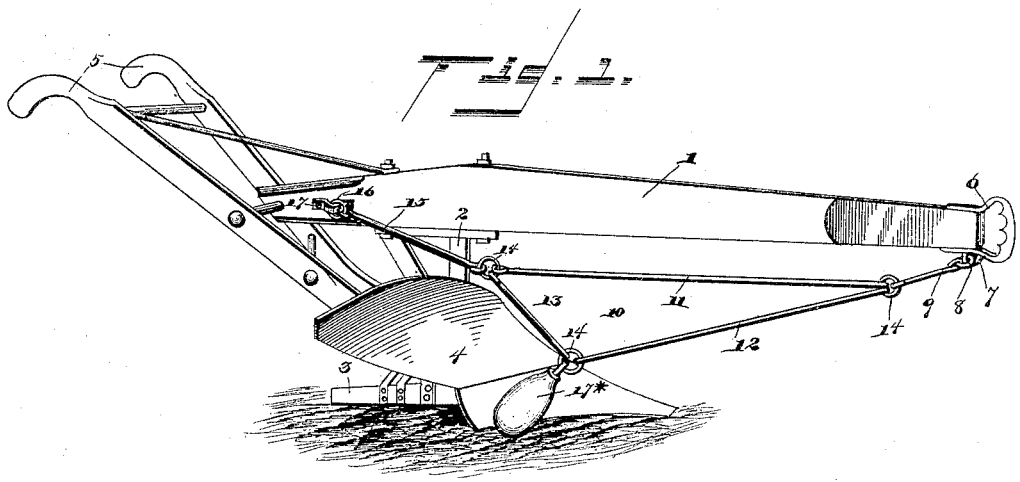
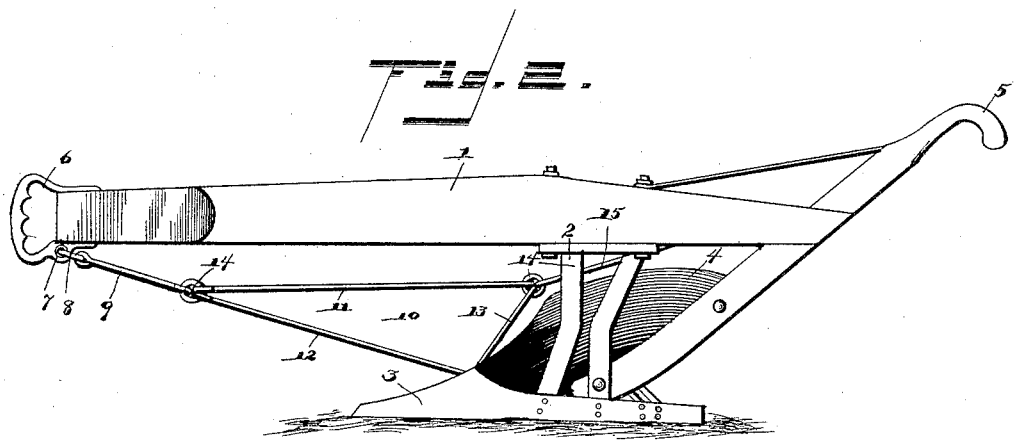
Witnesses
Samuel Ker
Wm. Bagger
Inventor
Wm. A. Lovelis.
By his Attorneys.
C. A. Snow & Co.

UNITED STATES PATENT OFFICE.

WILLIAM ALONZO LOVELIS, OF OZAN, ARKANSAS.

TURNING-PLOW.

SPECIFICATION forming part of Letters Patent No. 436,484, dated September 16, 1890.

Application filed May 17, 1890. Serial No. 352,142. (No model.)

*To all whom it may concern:*

Be it known that I, WILLIAM ALONZO LOVELIS, a citizen of the United States, residing at Ozan, in the county of Hempstead and State of Arkansas, have invented a new and useful Turning-Plow, of which the following is a specification.

This invention relates to turning-plows; and it has for its object to provide an improved attachment which may be readily applied to turning-plows of ordinary construction, and which shall effectually serve to turn weeds, stubble, cornstalks, and the like under the soil.

The invention consists in the improved construction of the said attachment, which will be hereinafter described, and particularly pointed out in the claims.

In the drawings hereto annexed, Figure 1 is a perspective view of a turn-plow equipped with my improved attachment; Fig. 2, a side elevation taken from the opposite side of the plow.

Like numerals of reference indicate like parts.

The plow to which my improved attachment is applied may be of any suitable well-known construction.

In the drawings hereto annexed a plow has been shown comprising the beam 1, standard 2, landside 3, mold-board 4, and handles 5. At the front end of the beam is mounted a clevis 6, provided on its under side with an eye 7, which is connected by a lap-link 8 with a rod 9.

10 designates a triangular frame composed of three rods 11, 12, and 13, which are connected at the corners by means of rings or links 14. The rings or links at the two upper corners of the said frame are connected, respectively, with the rod 9 and with a rod 15, the rear end of which is connected by means of a lap-link 16 with a clamp 17, suitably attached to the beam 1, directly behind the standard.

To the ring or link 14, at the lower corner of the triangular frame 10, is attached a weight 17\*, which is preferably elliptical or pear shaped, and which serves to form a drag for the purpose of turning the weeds and stubble under.

The operation of my invention will readily be understood from the foregoing description, taken in connection with the drawings hereto annexed.

My improved attachment, as will be readily understood, may be easily applied to a turning-plow of any ordinary construction, the clevis, having the eye 7, being applied to the front end, and the collar 16 to the rear end, of the beam, thus enabling the triangular frame having the drag-weight to be readily attached by means of the connecting-rods and lap-links. When the plow progresses over the field, the triangular frame, with the drag-weight at its lower rear corner, will serve to hold the weeds, stubble, and stalks well up against the mold-board, so that when the slides of sod are being turned by the latter the weeds and stubble will be effectually covered thereby.

In turning-plows of ordinary construction difficulty is very frequently experienced in turning under the weeds and stubble, which being left partly exposed will seriously interfere with the subsequent planting of seed and cultivation of the land. By my improvement the weeds and stubble are effectually turned under, thus serving to support the sod and to form underground drains, and the vegetable matter being thus thoroughly exposed to moisture will be rapidly decayed and tend to enrich the soil.

The elliptical or pear shaped drag-weight which is mounted at the lower rear corner of the triangular frame will slide easily over the ground without interfering with the progress of the plow, and will have the tendency of forcing the weeds and vegetable stalks in the desired direction over against the mold-board. It will also be seen that said weight, being solid and having a smooth surface, will not be liable to become entangled with the weeds and other obstructions.

Having thus described my invention, what I claim is—

1. The combination, with a turning-plow, of a drag attachment comprising a frame consisting of three rods loosely connected at the corners by means of rings or links, the rods connecting the upper corners of said frame with the clevis and with a collar at the rear end of the plow-beam, and an elliptical or pear shaped drag-weight mounted loosely at the lower corner of said frame, substantially as set forth.

2. The combination, with a plow, the clevis provided with an eye in its under side, the collar at the rear end of the plow-beam, the loosely-jointed triangular frame, the connecting-rods and lap-links, and the smooth elliptical or pear shaped drag-weight mounted loosely at the lower corner of the triangular frame, substantially as and for the purpose set forth.

In testimony that I claim the foregoing as my own I have hereto affixed my signature in presence of two witnesses.

WILLIAM ALONZO LOVELIS.

Witnesses:
 J. A. PRICE,
 L. M. BARTON.